(12) United States Patent
Niemi et al.

(10) Patent No.: US 8,554,773 B2
(45) Date of Patent: Oct. 8, 2013

(54) METHOD FOR INDEXING IMAGES AND FOR READING AN INDEX OF AN IMAGE

(75) Inventors: Sami Niemi, Skanör (SE); Johan Sten, Malmö (SE)

(73) Assignee: Mobile Imaging in Sweden AB, Lund (SE)

( * ) Notice: Subject to any disclaimer, the term of this patent is extended or adjusted under 35 U.S.C. 154(b) by 237 days.

(21) Appl. No.: 13/062,273

(22) PCT Filed: Sep. 8, 2009

(86) PCT No.: PCT/SE2009/051000
§ 371 (c)(1),
(2), (4) Date: May 18, 2011

(87) PCT Pub. No.: WO2010/027324
PCT Pub. Date: Mar. 11, 2010

(65) Prior Publication Data
US 2011/0213779 A1 Sep. 1, 2011

Related U.S. Application Data

(60) Provisional application No. 61/095,103, filed on Sep. 8, 2008.

(51) Int. Cl.
*G06F 17/30* (2006.01)
(52) U.S. Cl.
USPC ............... 707/741; 707/803; 707/E17.004
(58) Field of Classification Search
CPC ............ G06F 17/30864; G06F 17/30321; G06F 17/30613
USPC ............ 707/740, 741, 999.101, 803, E17.004
See application file for complete search history.

(56) References Cited

U.S. PATENT DOCUMENTS 4,553,206 A * 11/1985 Smutek et al. ............... 1/1
5,283,840 A * 2/1994 Kitamura et al. ............ 382/282

(Continued)

FOREIGN PATENT DOCUMENTS

WO 2005/050567 A1 6/2005

OTHER PUBLICATIONS

International Search Report: PCT/SE2009/051000 mailed Oct. 11, 2009.

*Primary Examiner* — Phuong Thao Cao
(74) *Attorney, Agent, or Firm* — Alston & Bird LLP (57) ABSTRACT

The present invention relates to a method for generating an index of Data Units of a Variable Length Coded (VLC) image. The method comprises categorizing Data Unit lengths, DU-lengths, as non indexed DU-lengths, categorizing DU-lengths not categorized as non-indexed DU-lengths as indexed DU-lengths, generating a value indicating the number of subsequent DU-lengths categorized as non-indexed in a sequence of subsequent DU-lengths categorized as non-indexed, generating a value indicating the number of subsequent DU-lengths categorized as indexed in a sequence of subsequent DU-lengths categorized as indexed, generating data representing the DU-length of each DU in the sequence of DU-lengths categorized as indexed, storing said generated values and data in the index of Data Units, and associating said index of Data Units with the VLC image. Further the invention relates to a method for retrieving Data Unit lengths, DU-lengths, from an image associated with an index of DU-lengths. This method comprises linearly reading data from the index, when the data is a value indicating a number of subsequent Data Units categorized as not having indexed DU-lengths then these Data Units is sequentially processed from the image for retrieving the length of each data unit, and when the data is a value indicating a number of subsequent Data Units categorized as having indexed DU-lengths then the corresponding number of DU-lengths are retrieved from the index.

13 Claims, 6 Drawing Sheets

(56) References Cited

U.S. PATENT DOCUMENTS

| | | | |
|---|---|---|---|
| 5,577,190 A * | 11/1996 | Peters | 345/501 |
| 5,964,842 A * | 10/1999 | Packard | 709/247 |
| 6,049,390 A * | 4/2000 | Notredame et al. | 358/1.15 |
| 6,125,211 A * | 9/2000 | Lu et al. | 382/241 |
| 6,128,621 A * | 10/2000 | Weisz | 1/1 |
| 6,266,455 B1 * | 7/2001 | Kobayashi | 382/307 |
| 6,310,647 B1 * | 10/2001 | Parulski et al. | 348/231.99 |
| 6,381,371 B1 | 4/2002 | Epstein et al. | |
| 6,513,050 B1 * | 1/2003 | Williams et al. | 1/1 |
| 7,007,031 B2 * | 2/2006 | MacInnis et al. | 1/1 |
| 7,277,585 B2 * | 10/2007 | Yagishita et al. | 382/232 |
| 7,327,290 B1 * | 2/2008 | Li | 341/65 |
| 7,369,706 B2 * | 5/2008 | Kurauchi | 382/239 |
| 7,480,418 B2 * | 1/2009 | Niemi et al. | 382/246 |
| 7,496,581 B2 * | 2/2009 | Nomiyama et al. | 1/1 |
| 7,519,632 B2 * | 4/2009 | Rhoads et al. | 1/1 |
| 7,545,293 B2 * | 6/2009 | Reznik | 341/67 |
| 7,570,827 B2 * | 8/2009 | Yang et al. | 382/245 |
| 7,894,521 B2 * | 2/2011 | Hannuksela | 375/240.12 |
| 8,134,742 B2 * | 3/2012 | Hagiwara | 358/1.9 |
| 2004/0151393 A1 * | 8/2004 | Kurauchi | 382/239 |
| 2005/0152608 A1 * | 7/2005 | Niemi et al. | 382/232 |
| 2006/0050697 A1 * | 3/2006 | Li et al. | 370/389 |
| 2006/0184555 A1 * | 8/2006 | Yamasaki | 707/101 |
| 2006/0288027 A1 * | 12/2006 | Murakami et al. | 707/101 |
| 2008/0086453 A1 * | 4/2008 | Fabian | 707/3 |
| 2008/0111722 A1 * | 5/2008 | Reznik | 341/67 |
| 2008/0140652 A1 * | 6/2008 | Millman et al. | 707/6 |
| 2008/0170625 A1 * | 7/2008 | Tian et al. | 375/240.23 |
| 2009/0226062 A1 * | 9/2009 | Nakamura | 382/128 |
| 2010/0013680 A1 * | 1/2010 | Chen et al. | 341/67 |
| 2010/0014590 A1 * | 1/2010 | Smith | 375/240.19 |
| 2010/0329547 A1 * | 12/2010 | Cavet | 382/164 |

* cited by examiner

METHOD FOR INDEXING IMAGES AND FOR READING AN INDEX OF AN IMAGE

TECHNICAL FIELD

The present invention relates to encoding and decoding images and more particular to speeding up processes arranged to manipulate the image. The present invention relates specifically to a method for indexing images and a method for reading said index.

BACKGROUND

Images encoded by means of a Variable Length Code (VLC), e.g. JPEG images, are cumbersome and time consuming to manipulate. In cases where you only are interested of viewing or manipulating a portion of the image or retrieve the image or partitions of it in a smaller scale (not requiring all VLC codes to be processed within the desired area) this is even more evident. In order to speed up such processes techniques involving indexing of the positions of Data Units (DUs) or Minimum Coded Units (MCUs) in the image has been suggested in order to enable quick access to elements within the image without the need of decoding all image data. In some applications this is referred to as random access of the image. The position may be stored as a absolute position or a relative position, i.e. relative to the position of the previous DU or MCU. In a JPEG image the DU represents a bit stream of an 8×8 block of one color channel, while an MCU usually consists of several DU's from multiple channels. The length of a DU or MCU are dependent on the content within the blocks they represent, the more information there is in the block, the more bits the DU or MCU will be.

However, storing the relative position of all DUs, e.g. the length of each DU, in the index requires quite much storage capacity as the lengths may require up to 12-bits per DU. Meaning that a 5 mega pixel image in YUV422 format would require 2560*1920/16/8*4*12/8=230 kb.

SUMMARY

One object of the invention is to provide an improved method for compressing an index for an image file and an improved method for decompressing said index.

According to one aspect of the invention the above object is achieved by a method for generating an index according to claim 1 and according to another aspect of the invention the above object is achieved by means of a method for retrieving Data Unit lengths from an image associated with an index of DU-lengths according to claim 9. Embodiments of the invention are disclosed in the dependent claims.

In particular, according to one aspect of the invention, a method for generating an index of Data Units of a Variable Length Coded (VLC) image, said method comprises:

categorizing Data Unit lengths, DU-lengths, as non indexed DU-lengths, categorizing DU-lengths not categorized as non-indexed DU-lengths as indexed DU-lengths, generating a value indicating the number of subsequent DU-lengths categorized as non-indexed in a sequence of subsequent DU-lengths categorized as non-indexed, generating a value indicating the number of subsequent DU-lengths categorized as indexed in a sequence of subsequent DU-lengths categorized as indexed, generating data representing the DU-length of each DU in the sequence of DU-lengths categorized as indexed, storing said generated values and data in the index of Data Units, and associating said index of Data Units with the VLC image.

One advantage of categorizing and processing different DU-lengths differently is that it becomes possible to perform fast manipulations of the image and making the amount of required overhead data small. Moreover, in some cases where indexing has not been considered because of the added size the invention may make it possible to embed the index in a header of the image file or in a separate file allowing faster decoding of random image blocks of an image. The advantage of classifying DU-lengths is that one is able to store only the DU-lengths that are cumbersome to recreate, e.g. DU-lengths representing a large value and thereby a long DU. It is for example then possible skip storing the DU-lengths representing very short DUs, as they can be quickly recreated later.

In one embodiment the storing of said generated data comprises storing said value indicating the number of subsequent DU-lengths categorized as indexed after said value indicating a number of subsequent DU-lengths categorized as non-indexed, and storing data representing the DU-lengths of the subsequent DU-lengths categorized as indexed, said data being stored subsequent to the value indicating the number of subsequent DU-lengths categorized as indexed. By storing the different information types in relation to each other as mentioned above the use of the index file and the extracting of the data are facilitated.

In another embodiment the index is encoded by means of a Variable Length Code encoder. Thereby making the index require even less memory space.

In yet another embodiment the data indicating the number of non-indexed and indexed DU-lengths are numerically translated symmetrically around zero before encoding.

In one embodiment data representing a DU-length are set to a value representing the difference of the present DU-length and the previous DU-length. The data of the index may be Huffman coded.

According to another embodiment the categorization includes comparing DU-lengths with a predetermined threshold value and categorizing a DU-length as a non-indexed DU-length if the value of the DU-length is less than the value of the threshold.

In another embodiment the image is divided into a plurality of blocks and wherein each block is represented by at least three channels, each channel representing a characteristics of the image, wherein a data unit is a channel within a block, and wherein the method further comprising:

reading all three channels of a block, before the channels of the next block are read, generating data relating to subsequent DU-lengths categorized as non-indexed and data relating to subsequent DU-lengths categorized as indexed individually for each component, and storing the generated data sequentially in the index.

In yet another embodiment each image includes a plurality of channels and wherein values and data from a plurality of channels are interleaved into one data stream.

According to another aspect of the invention a method for retrieving Data Unit lengths, DU-lengths, from an image associated with an index of DU-lengths, said method comprising:

linearly reading data from the index, when the data is a value indicating a number of subsequent Data Units categorized as not having indexed DU-lengths then these Data Units is sequentially processed from the image for retrieving the length of each data unit, and when the data is a value indicating a number of subsequent Data Units categorized as having indexed DU-lengths then the corresponding number of DU-lengths are retrieved from the index.

One advantage of using an index in which different DU-lengths are categorizing and processed differently is that it becomes possible to perform fast manipulations of the image and making the amount of required overhead data small. Moreover, in some cases where indexing has not been considered because of the added size the invention may make it possible to embed the index in a header of the image file or in a separate file allowing faster decoding of random image blocks of an image. The advantage of using classified DU-lengths is that one is able to store only the DU-lengths that are cumbersome to recreate, e.g. DU-lengths representing a large value and thereby a long DU. It is for example then possible skip storing the DU-lengths representing very short DUs, as they can be quickly recreated later.

In one embodiment the data from the index is decoded by means of a Variable Length Code decoder.

In another embodiment the image is divided into a plurality of blocks and each block is represented by at least three channels, first, second and third channel, each channel representing different characteristics of the image, wherein a data unit is a channel of a block, and wherein the method further comprising:

reading data from the index indicating the number of subsequent data units of the first channel that is to be retrieved, reading data from the index indicating the number of subsequent data units of the second channel that is to be retrieved, reading data from the index indicating the number of subsequent data units of the third channel that is to be retrieved, and retrieving a DU-length for each channel of a block in accordance with DU-lengths being categorized as indexed or non-indexed.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in further detail by way of example under reference to the accompanying drawings, on which.

DETAILED DESCRIPTION

The present invention will now be described more fully hereinafter with reference to the accompanying drawings, in which certain embodiments are shown. Like numbers refer to like elements throughout.

The present invention is related to a method for generating an index over Data Unit lengths, hereinafter referred to as DU-lengths, of a specific image and to a method for retrieving DU-lengths from an index generated in accordance with the previous method.

Figure 1:
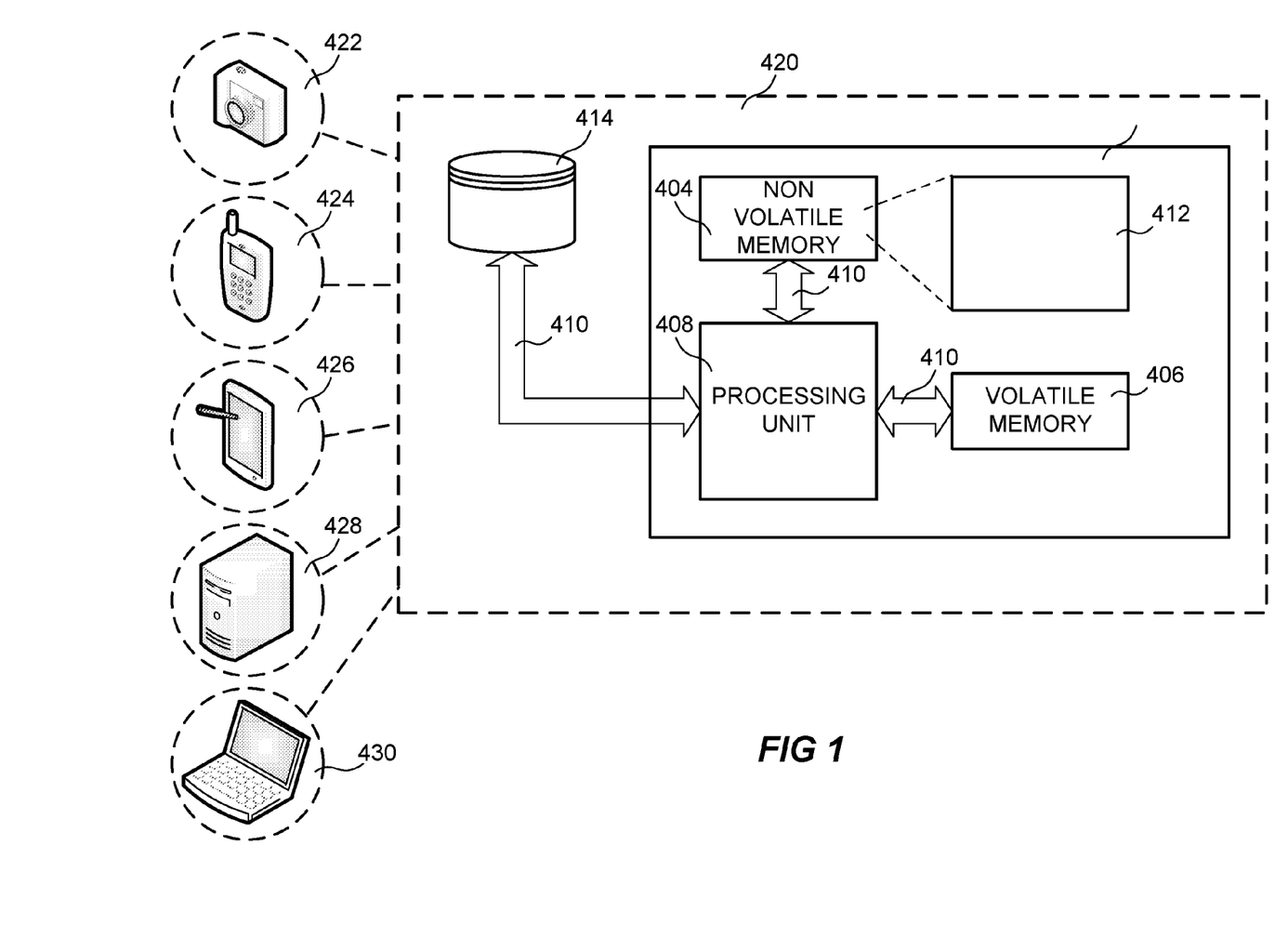
FIG. 1 is a schematic block diagram of an image data indexer in accordance with one embodiment of the invention.

The method for generating an index over DU-lengths are implemented or comprised in an image data indexer 402, see FIG. 1. The image data indexer includes a non volatile memory 404, a volatile memory 406, a processing unit 408, and a bus 410 connecting memories to the processing unit for execution of process defining code 412 stored in the non volatile memory 404. The process defined by the code 412 will be described later in this specification. How to assemble the above mentioned devices into a unit that enables processing of the code is well known in the art and to the skilled person. Further, the image having its DUs indexed may be stored in any memory 404, 406, 414, accessible by the image data indexer 402, such accessible memory may include the two memories mentioned above 404, 406, and any additional database 414, hard drive 414, solid state memory module 414, etc, connected to the image data indexer 402.

The image data indexer 402 may be a single purpose device 402, i.e. not designed to do anything but generating indexes over DU-lengths of images, or it may be included in a device 420 having another main purpose. The image data indexer 402 may for instance be included or embedded in a digital camera 422, mobile phone 424, a personal digital assistant (PDA) 426, a server storing images 428, a general computer storing images 430, etc. In these devices the image data indexer 402 may process images stored in each device, respectively, and in some of the devices which allow acquisition of images the image data indexer may process images acquired by the device. It would even be possible to set up the image data indexer 402 to retrieve image data to index from a network, i.e. a LAN, the Internet etc.

In case of the image indexer is included or embedded in a device 420 having another main purpose as described above then the image data indexer 402 may share memory devices 404, 406, 414, with that device 420.

From the following description it will be evident how the image data indexer transforms image data into an index over the image's DU-lengths.

Figure 2A:
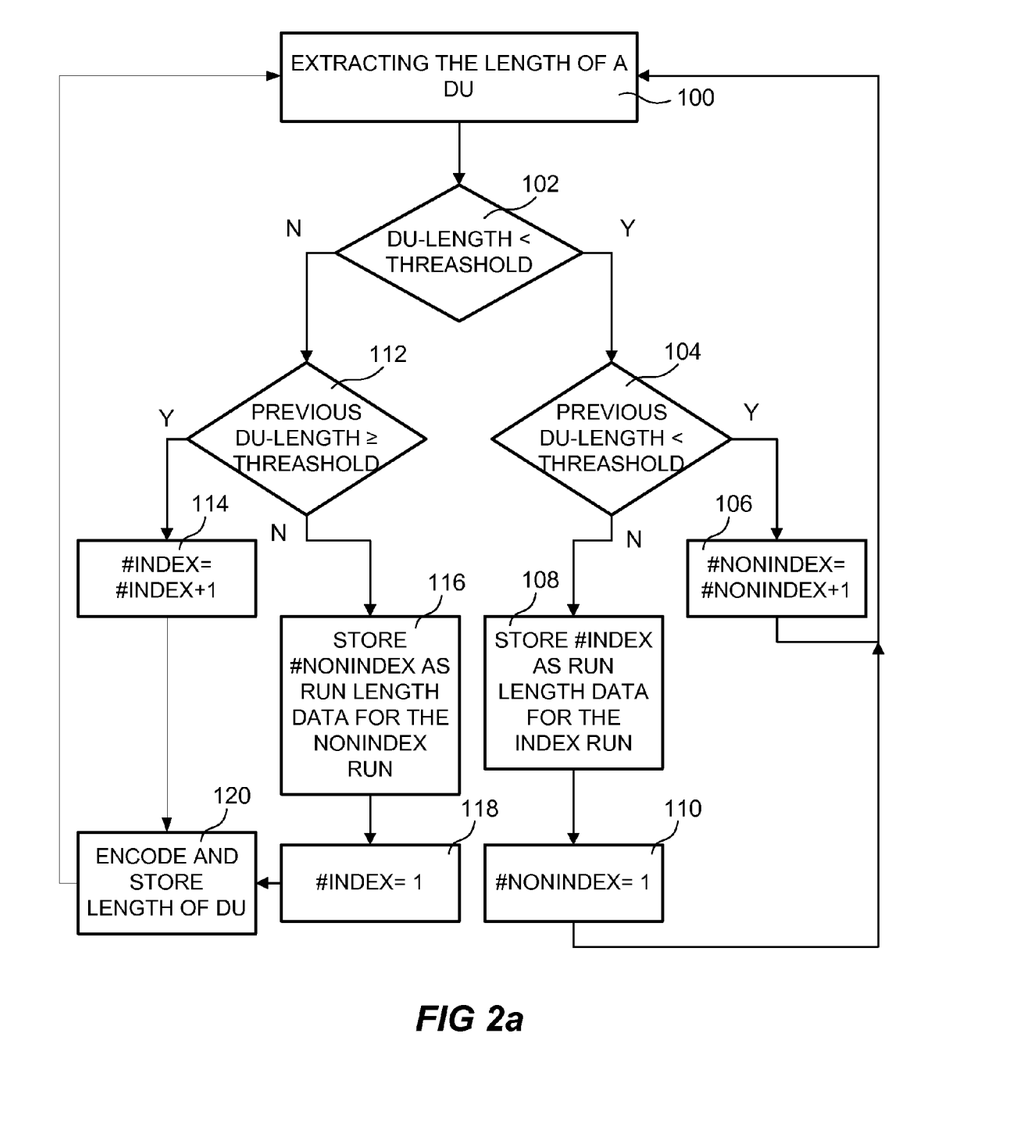
FIG. 2a is a flow chart of a method for generating an index in accordance with one embodiment of the invention.

According to one aspect the present invention is relates to a method for generating an index over DU-lengths of an image in order to allow faster decoding of random blocks of the image. By generating an index of DU-lengths it becomes possible to quickly access any DU without having to decode all DUs that have to be passed in order to establish the position of a DU in a file having Variable Length Coded information. The method is shown in FIG. 2a and includes extracting a length of a data unit, DU, from the image, step 100. The DU lengths could also be precalculated and exist as an array of DU-lengths. The DU-length is analyzed and categorized as an indexed DU-length, for which the DU-length is stored in the index, or as a non-indexed DU-length, for which no DU-length is stored in the index. In one embodiment the DU-lengths are categorized by comparing extracted DU lengths to a predetermined threshold value, step 102. A DU-length may be categorized as one that is to be indexed, "indexed" or one that do not need to be indexed, "non-indexed". In the present application categorizing of a DU-length is to be understood as assigning a DU-length to a category, from a list of categories including indexed and non-indexed.

In this particular embodiment, if the DU-length is less than the threshold value then the DU-length is categorized as a non-indexed DU-length and in the process it is checked if the previous DU-length also where less than the threshold, i.e. non-indexed DU-length, step 104.

If the previous DU-length also was a non-indexed DU-length then a counter counting the number of consecutive non-indexed DU-lengths, #nonindex, is incremented by one, step 106. Then the process returns to extracting the next DU-length in step 100.

If the previous DU-length was categorized as an indexed DU-length, i.e. the DU-length was greater than or equal to the threshold, then the present value of a counter, #index, counting the number of consecutive indexed DU-lengths, is stored in the index, step 108. As can be seen in FIG. 2 the value of the counter, 140, is stored at a position in the index that is preceding the position in the index of the data related to the DU-lengths counted by the counter and resulting in the #index value. The insertion of the #index value at the position preceding the already stored may be performed in a number of ways, e.g. by simply inserting the #index value between the already stored #non-index value and the data related to the DU-lengths corresponding to the #index value to be stored.

When the present value of #index is stored in the index then the counter #nonindex is set to 1, step 110. Then the process returns to step 110, and a new DU-length is extracted.

If the DU-length is equal to or larger than the threshold then the DU-length is categorized as an indexed DU-length and in the process it is checked if the previous DU-length also where equal to or larger than the threshold, i.e. indexed DU-length, step 112.

If the previous DU-length also was an indexed DU-length then a counter counting the number of consecutive indexed DU-lengths, #index, is incremented by one, step 114. Then the process encodes the present DU-length and stores it in the index, step 120. The encoding may include storing the value of the DU-length using a scheme for decrease the memory space required for storing of the value, examples are given later in the specification. Then the process returns to extracting the next DU-length in step 100.

If the previous DU-length was categorized as a non-indexed DU-length, i.e. the DU-length was less than the threshold, then the present value of the counter, #nonindex, counting the number of consecutive non-indexed DU-lengths, is stored in the index, step116. As can be seen in FIG. 2 the value of the non-index counter, 142, is stored before a subsequent value of the number of indexed DU-lengths. When the present value of #nonindex is stored in the index then the counter #index is set to 1, step 118. Then the process encodes the present DU-length and stores it in the index, step 120. Thereafter the process returns to step 100, and a new DU-length is extracted.

Figure 2B:
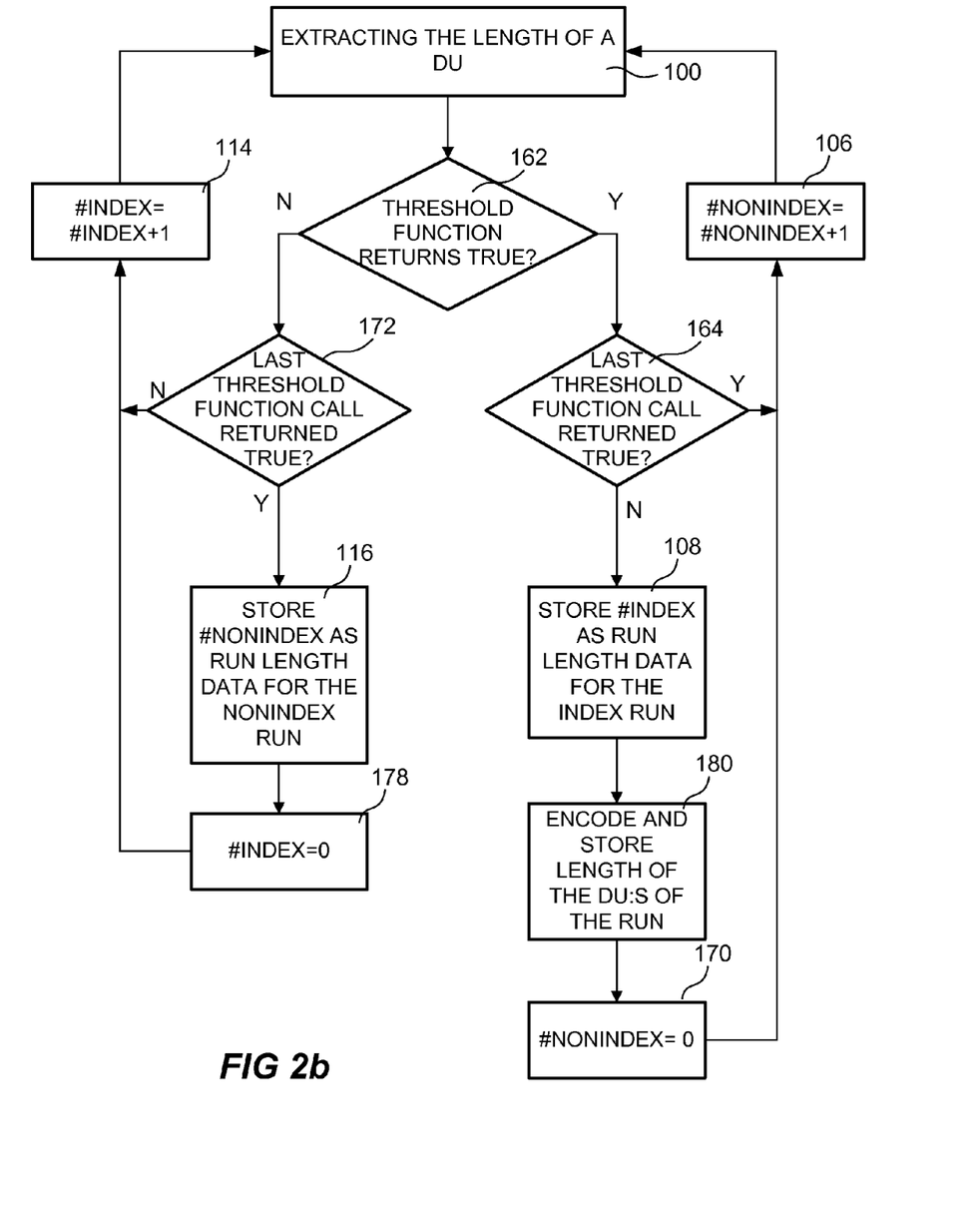
FIG. 2b is a flow chart of a method for generating an index in accordance with another embodiment of the invention.

In FIG. 2*b* the method of another embodiment is showed. This process is similar to the process of 2*a*. One difference is that the length of the DUs of a run is encoded and stored when the DU-length no longer is categorized as a DU-length to be stored in the index instead of encoding and storing each DU-length when they are detected.

The method in FIG. 2*b* includes extracting a length of a data unit, DU, from the image, step 100. The DU-lengths could also be precalculated and exist as an array of DU lengths. The DU-length is analyzed and categorized as an indexed DU-length, for which the DU-length is stored in the index, or as a non-indexed DU-length, for which no DU-length is stored in the index. In one embodiment the DU-lengths are categorized by means of a threshold function, step 162. A DU-length may be categorized as one that is to be indexed, the threshold function returns false, or one that do not need to be indexed, the threshold function returns true.

In this particular embodiment, if the threshold function returns true then the DU-length is categorized as a non-indexed DU-length and in the process it is checked if the previous DU-length also returned true, i.e. non-indexed DU-length, step 164.

If the previous DU-length also was a non-indexed DU-length, i.e. threshold function returned true, then a counter counting the number of consecutive non-indexed DU-lengths, #nonindex, is incremented by one, step 106. Then the process returns to extracting the next DU-length in step 100.

Figure 3:
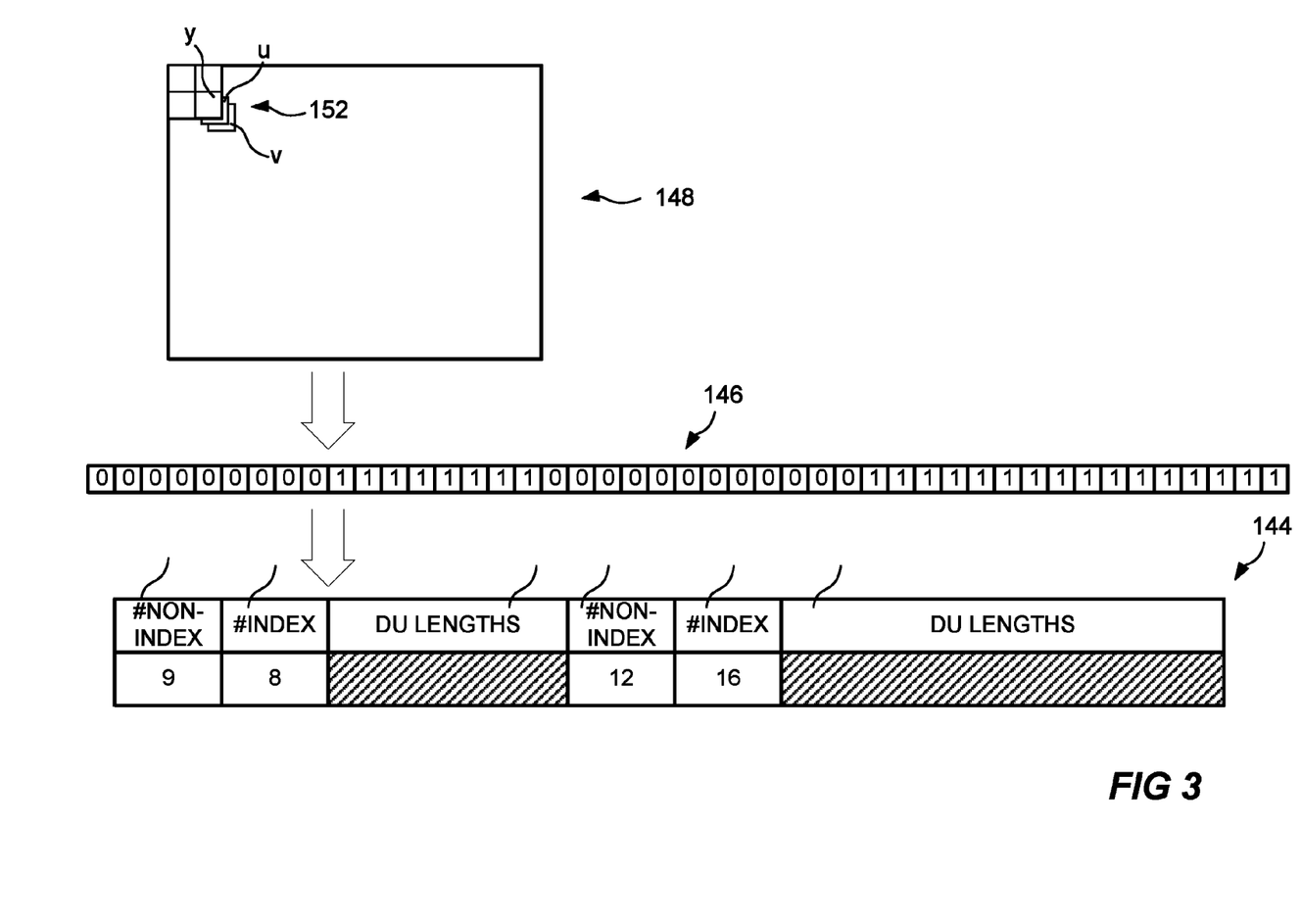
FIG. 3 is a schematic diagram of a portion of an index generated from specific data.

If the previous DU-length was categorized as an indexed DU-length, i.e. the previous threshold function returned false, then the present value of a counter, #index, counting the number of consecutive indexed DU-lengths, is stored in the index, step 108. As can be seen in FIG. 3 the value of the counter, 140, is stored at a position in the index that is preceding the position in the index of the data related to the DU-lengths counted by the counter and resulting in the #index value. Further, the process encodes all the DU-lengths from the previous run of indexed DU-lengths and stores them in the index, step 180. Then the counter #nonindex is set to 0, step 170, and is incremented by one, step 106. Thereafter, the process returns to step 110, and a new DU-length is extracted.

If the threshold function returns false then the DU-length is categorized as an indexed DU-length and in the process it is checked what the previous threshold function returned, step 172.

If the previous threshold function returned false then a counter counting the number of consecutive indexed DU-lengths, #index, is incremented by one, step 114. Then the process returns to extracting the next DU-length in step 100.

If the previous threshold function returned true, then the present value of the counter, #nonindex, counting the number of consecutive non-indexed DU-lengths, is stored in the index, step116. As can be seen in FIG. 2 the value of the non-index counter, 142, is stored before a subsequent value of the number of indexed DU-lengths. When the present value of #nonindex is stored in the index then the counter #index is set to 0, step 178, and is incremented by one, step 114. Thereafter the process returns to step 100, and a new DU-length is extracted.

FIG. 3 describes a portion of an index 144 resulting from the process of the method above or any other similar process. The specific example of the resulting index in FIG. 3 is based on the image data of an image file 148 comprising a plurality of MCUs 152. The MCU 152 includes Data Units (DU) u,u,v. As described above the length of each DU is categorized in accordance with a predetermined scheme. The result from categorizing is presented in the categorization list 146. Such an array is not necessary generated in the process, but is depicted in the figure in order to facilitate understanding of the generated index 144, and may be seen as a presentation of the result from process step 102 of FIG. 2*a* or process step 162 in FIG. 2*b*. A zero in the categorization list 146 represents a non-indexed DU-length and a one in the categorization list 146 represents an indexed DU-length. Now the generation of the index 144 when the DU-lengths of the image file may be categorized as in the categorization list 146 is described in more detail. Nine non-indexed DU-lengths result in a value of nine for the non-index run length. Then, eight indexed DU-lengths results in a value of eight for the indexed run length, and the data 150 representing these eight DU-lengths are then inserted in the index after the indexed run length value, the data 150 is a representation of each DU-length of the eight DU-lengths. The corresponding steps are performed for the rest of the categorized DU-lengths for generating the index in FIG. 3. Observe that the index 144 showed in FIG. 3 only presents a part of an index 144.

Figure 4:
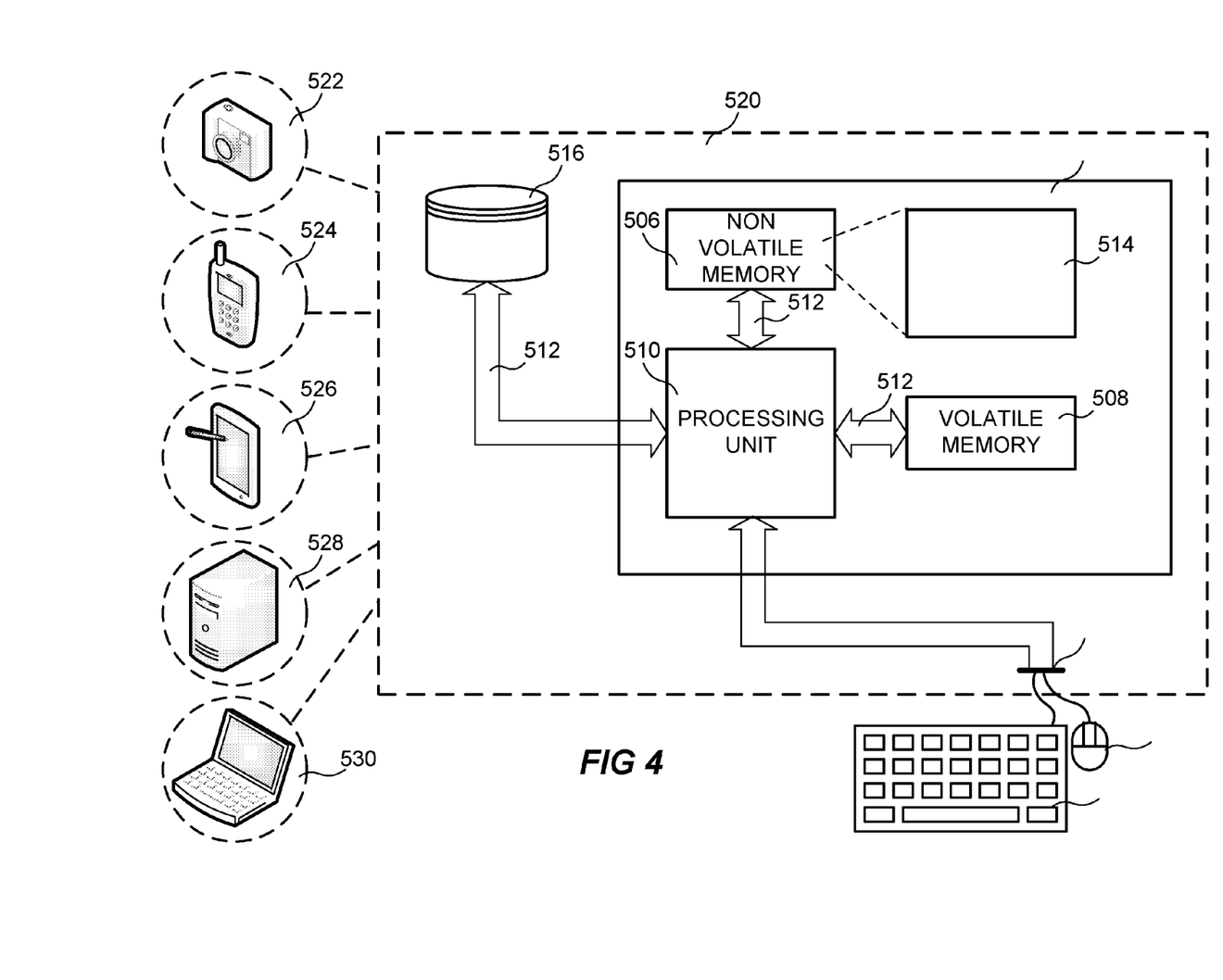
FIG. 4 is a schematic block diagram of an image data extractor in accordance with one embodiment of the invention.

According to another aspect of the invention the generated index may be utilized in an image data extractor 502, which is arranged to access a subset of the image data in a digital image. A subset of image data is often used in manipulations of images such as zooming, panning, or when only a portion of an image is to be manipulated. In such applications the above generated index may be used in order to access the subset of image data without the need to decode all data of the image. According to one embodiment the image data extractor 502 includes an input interface 504, a non volatile memory 506, a volatile memory 508, a processing unit 510, and a bus 512 connecting memories 506, 508, to the processing unit 510 for execution of process defining code stored in the non volatile memory 506.

The process defined by the code will be described later in this specification. How to assemble the above mentioned devices into a unit that enables processing of the code is well known in the art and to the skilled person. Further, the image being operated on and the index of that image may be stored in any memory 506, 508, accessible by the image data extractor 502, such accessible memory may include the two memories mentioned above 506, 508, and any additional database 516, hard drive 516, solid state memory module 516, etc, connected to the image data extractor 502.

From the input interface the processing unit of the image data extractor receives data indicating a start position within the image from which image data are to be extracted. The input may also include data defining the sub area of the image that are to be extracted. The extracted image data may be used to present a sub image of the total image on a display or to be sent to an image warp engine in order to skew, rotate, distort, filter or perform any other function on the subset of the image data.

The image data extractor 502 may be a single purpose device 502, i.e. not designed to do anything but interpreting the data of the index in order to quickly retrieve positions in image file corresponding to data of the input representing positions in the image and to either extract the corresponding image data from the VLC-file or provide the data making it possible for an external procedure to extract the image data from the VLC-file. Further the image data extractor 502 may be included in a device 520 having another main purpose. The image data extractor 502 may for instance be included or embedded in a digital camera 522, mobile phone 524, a personal digital assistant (PDA) 526, a server storing images to be presented 528, a general computer storing images 530, etc. In these devices the image data extractor 502 may process indexes, and possibly the related image, stored in an accessible memory, i.e. any local or external memory. In some of the devices which include a display the image data extractor may be part of or used by the display process of that particular device.

The input interface 504 may be connected to an input device of the image data extractor 502 or to the device in which the image data extractor 502 is included. The input devices may for instance be a mouse 532, a keyboard 534, a keypad, a touch screen, a touch pad, etc.

Figure 5:
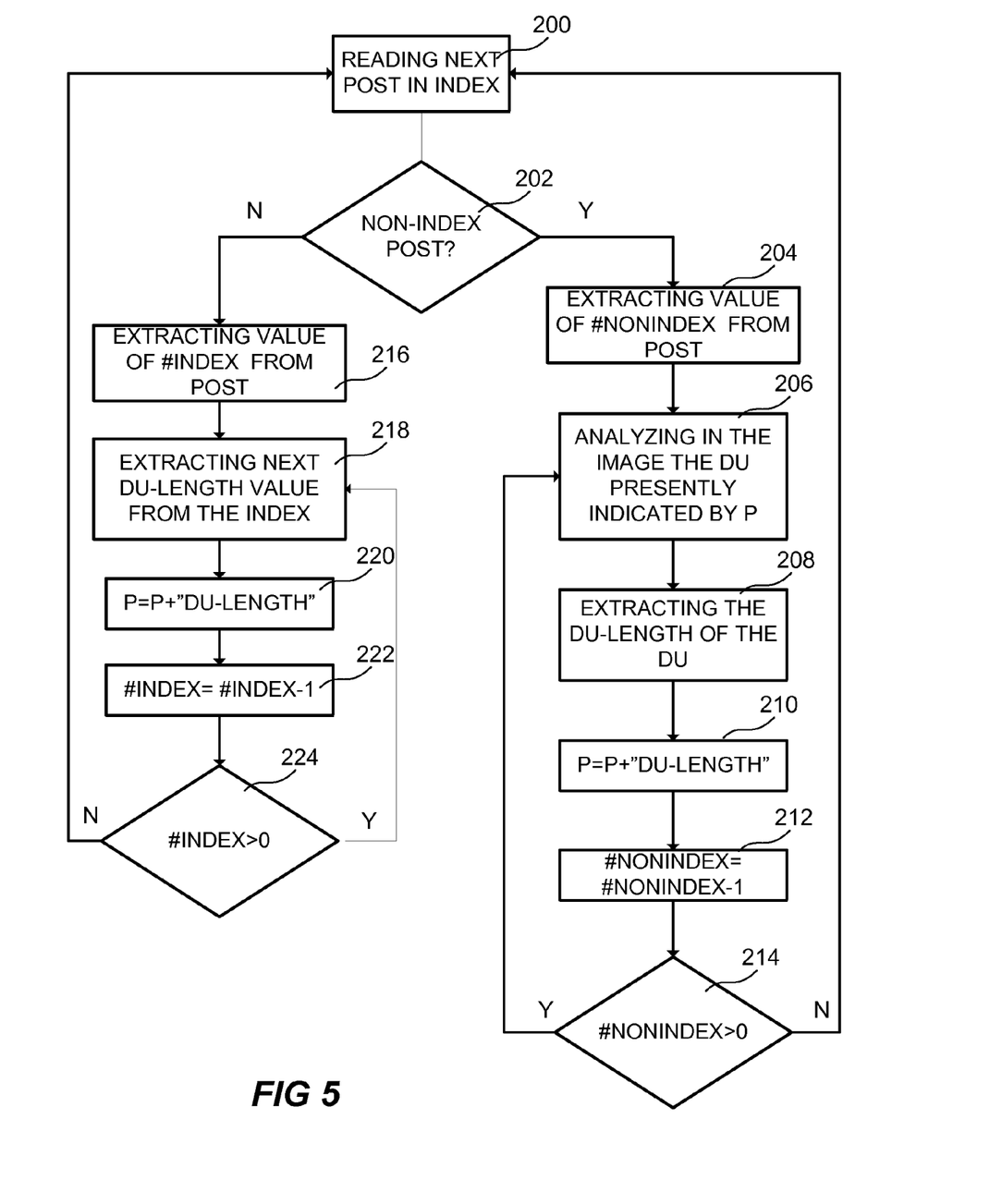
FIG. 5 is a flow chart of a method for reading or decoding the index when accessing an image.

One embodiment of using or decoding the index is shown in the diagram of FIG. 5. If the process of reading the index is just started, then the step of reading next post in index, step 200, represents reading of the first post of the index. In other cases it relates to reading next post in index 200.

If the post is an non-index post, step 202, then the value of #nonindex is extracted from the post in step 204. Because the post were a non-index post there are no DU-lengths stored in the index for these posts and the process analyses the DU presently indicated by a pointer P, step 206. From the analysis, e.g. decoding of a DU of an JPEG image and counting the number of bits, of the DU the DU-length may be retrieved, step 208. The value of the DU-length is added to the pointer P, step 210, thereby making the pointer point to the next DU. The value of #nonindex is then decreased by one, step 212, and if the value of #nonindex is greater than 0, step 214, there are additional non-index DUs to process and therefore the process return to step 206. However, if the value of #nonindex equals 0 then there are no additional non-index DUs to process and the process returns to step 200 to read the next post in the index.

If the next post in the index is not a non-index post, step 202, then the value of #index is extracted from the index, step 216. The #index indicates the number of DU-lengths that is consecutively stored in the index in relation to this #index post. In step 218 the next DU-length value is extracted from the index, this extraction may include decoding. The value of the DU-length is added to the pointer P, step 220, thereby making the pointer point to the next DU. The value of #index is then decreased by one, step 222, and if the value of #index is greater than 0, step 224, there are additional indexed DUs to process and therefore the process return to step 218. However, if the value of #index equals 0 then there are no additional indexed DUs to process and the process returns to step 200 to read the next post in the index.

According to one embodiment of the invention, channels of an image including a plurality of channels are coded in the index in an interleaved way, see description below. For instance the y, u, and v channels of a JPEG may be coded in an interleaved way. The encoding is performed in a procedure similar to the one of figure one. The difference is that each iteration is performed for each channel in an image block, before the DUs related to the channels of the next image block is processed. Another way to look at it is that values and data from a plurality of channels are interleaved into one data stream. During decoding the procedure is also similar to the previously mentioned process, i.e. each channel is decoded by itself but interleaved with the other channels.

From this specification it is clear that the process of using the index may be seen as transforming a definition of a position within an image from a spatial notation to a definition of a position in the image data file in a relative or absolute address notation. According to another aspect the idea may be seen as making use of a Run Length Encoding (RLE) and to partition the Data Unit lengths from the index into alternating runs of non-indexed data (hereafter also referred to as zero data) and indexed data (hereafter also referred as non-zero data), by using some kind of classification strategy, such as thresholding.

Non-interleaved RLE

If we start with looking at a simplified case, with one color component only, the following might be our input, with dashes for non-indexed data, referred to as zero data below, and crosses for indexed data, referred to as non-zero data below.

```
         1         2         3         4         5         6         7         8
12345678901234567890123456789012345678901234567890123456789012345678901234567890123
Y --------------------------xxxxxxxxxxxxxxxxx-------xxxxxxxxxxxxx-----------------
```

So in a RLE coded stream we first have a run length for the run of zeroes,

```
<run length>
After that we output the run length of the non-zero data,
<run length>
```

After that, the non-zero data is outputted, the number of items being as specified in the run length of the non-zero data,
<non-zero data>
Then we repeat, until a given number of coefficients have been processed.

Looking back at our input example the following output should be written:

```
<25>,       run length (zero data)
<18>,       run length (non-zero data)
<18 y>,     non-zero data, 18 coefficients
<7>,        run length (zero data)
<15>,       run length (non-zero data)
<15 y>,     non-zero data, 15 coefficients
<18>,       run length (zero data)
```

Where y indicates a single channel. The corresponding decoding process would look something like this,

```
sum = 0
while (sum != endsum)
{
  len = decodeRunLength( )
  sum += len
  while (len-- > 0)
    do a full indexing of the zero elements
  len = decodeRunLength( )
  sum += len
  while (len-- > 0)
    decodeDuLength( )
    do indexing based on the non-zero length
}
```

Interleaving the Components

The index data is based around interleaved Data Unit lengths, and the indexing itself around MCUs, whereby it's preferred to interleave the different components, also referred to as channels, of the MCUs into a single output channel that can be processed in a linear way by a decoder to retrieve the MCU components in the order they are used in decoding a JPEG.

One way to do this is to redefine the run length granularity to be in MCUs instead of in DUs, and to interleave the run length and data. A segment is defined as a section or run of the interleaved data in which no change of the categorization of any of the components take place. In other words a run of data where having the same type of interleaved data, e.g. (zero, zero, non-zero), from the components of the MCU.

If we look at the following example the first nine segments are:
position 1, (zero, zero, zero), length 0
position 1, (zero, zero, non-zero), length 3
position 4, (zero, zero, zero), length 1
position 5, (zero, non-zero, zero), length 9
position 14, (zero, non-zero, non-zero), length 4
position 18, (zero, zero, non-zero), length 5
position 23, (zero, zero, zero), length 1
position 24, (zero, zero, non-zero), length 2
position 26, (non-zero, zero, non-zero), length 4

Before each "segment" we output any new run lengths that begin at the start of the new segment, and then for each segment we output the non-zero data for that segment, in interleaved order.

```
                    - segment 0 -
<25>,       y run length (zero data)
<4>,        u run length (zero data)
<0>,        v run length (zero data)
                    - segment 1 -
<3>,        v run length (non-zero data)
<3 v>,      v non-zero data
                    - segment 2 -
<10>,       v run length (zero data)
                    - segment 3 -
<13>,       u run length (non-zero data)
<9 u>,      u non-zero data
                    - segment 4 -
<9>,        v run length (non-zero data)
<4 u/v>,    u, v non-zero data
                    - segment 5 -
<12>,       u run length (zero data)
<5 v>,      v non-zero data
                    - segment 6 -
<1>,        v run length (zero data)
                    - segment 7 -
<10>,       v run length (non-zero data)
<2 v>,      v non-zero data
                    - segment 8 -
<18>,       y run length (non-zero data)
<4 y/v>,    y, v non-zero data
                    - segment 9 -
<8>,        u run length (non-zero data)
<4 y/u/v>,  y, u, v non-zero data
...
```

Note that the first segment is set to be all zeroes, even if this means the segment is of size 0. We must have a known starting point for component run types.

The interleaved decoding process would look something like this,

```
y_run = 0
u_run = 0
```

```
          1         2         3         4         5         6         7         8
 12345678901234567890123456789012345678901234567890123456789012345678901234567890123
y ---------------------------xxxxxxxxxxxxxxxxxx------xxxxxxxxxxxxxxx-----------------
u ----xxxxxxxxxxxxx-----------xxxxxxx--------xxx------xxxxxxxxxxxxxxxxx--------xxx
v xxx---------xxxxxxxxx-xxxxxxxxx--------xxxxxxxxxxxxxxxxx--------xxxx--------xxxxx-
```

-continued

```
v_run = 0
y_type = 1
u_type = 1
v_type = 1
while
{
  if (y_run == 0)
     y_run = decodeRunLength( )
     y_type = ~y_type
  if (u_run == 0)
     u_run = decodeRunLength( )
     u_type = ~u_type
  if (v_run == 0)
     v_run = decodeRunLength( )
     v_type = ~v_type
  run = min(y_run, u_run, v_run)
  for (i = 0; i = run; i++)
  {
     if (y_type == 1)
        decodeDuLength( )
        do indexing based on the non-zero length
     else
        do a full indexing (zero DU length)
     if (u_type == 1)
        decodeDuLength( )
        do indexing based on the non-zero length
     else
        do a full indexing (zero DU length)
     if (v_type == 1)
        decodeDuLength( )
        do indexing based on the non-zero length
     else
        do a full indexing (zero DU length)
  }
  y_run -= run
  u_run -= run
  v_run -= run
}
```

Entropy Coding

So far no mention has been made as to HOW the run lengths or the DU lengths may be encoded.

According to one embodiment, which makes it possible to re-use much program code and data, run lengths and DU lengths may be encoded using the same encoding scheme as used in JPEG to encode the differential DC coefficients. The same functions are called and the same encoding/decoding tables are used.

Run lengths are transformed into a space symmetrical around zero, to make a better fit with the distribution of JPEG DC coefficients.

| Run Length | Coefficient |
|---|---|
| 0 | 0 |
| 1 | −1 |
| 2 | 1 |
| 3 | −2 |
| 4 | 2 |
| 5 | −3 |
| 6 | 3 |
| etc. | |

Data Unit lengths are encoded differential, just like the JPEG DC coefficients.

By using the same code and tables already in use in the decoding/indexing inner loop for decoding the DC coefficients, it is possible to gain speed from cache coherency, i.e. that the address of the data or value requested already is cached due to another or the same process have been accessing the same data or value.

Run lengths are limited in length by the way the Huffman table for that component looks. If the table support e.g. categories up to 10, run length have to be shorter than 2047. Runs longer than 2047 will have to be divided into multiple 2046-runs separated by 0-runs.

| Category | Coefficient | Run lengths |
|---|---|---|
| 0 | 0 | 0 |
| 1 | −1, 1 | 1-2 |
| 2 | −3--−2, 2-3 | 3-6 |
| 3 | −7--−4, 4-7 | 7-14 |
| 4 | −15--−8, 8-15 | 15-30 |
| 5 | −31--−16, 16-31 | 31-62 |
| 6 | −63--−32, 32-63 | 63-126 |
| 7 | −127--−64, 64-127 | 127-254 |
| 8 | −255--−128, 128-255 | 255-510 |
| 9 | −511--−256, 256-511 | 511-1022 |
| 10 | −1023--−512, 512-1023 | 1023-2046 |
| 11 | −2047--−1024, 1024-2047 | 2047-4094 |
| 12 | −4095--−2048, 2048-4095 | 4095-8090 |
| ... | | |

Classification by Thresholding

According to one embodiment two kinds of thresholding are used in determining the category of a DU.

The first is the easiest and deals with classifying a DU length as either zero or non-zero. The trivial way is to simply set length below N to zero. The non-trivial way would be to, e.g. take the histogram of DU lengths, sort it, and setting any lengths below the N most usual to zero.

The second looks at the run lengths and tries to remove "very small" (where "very small" is a parameter of the compression algorithm) runs by joining them with its neighbors, de facto changing its type to that of its neighbors.

According to another embodiment the thresholding for a particular DU is performed based on the mean value of the DU combined with nearby DUs. The nearby DUs may include DUs from the neighboring components.

Compressing the Index Data

According to one embodiment compressing of index data may be implemented to go through the component DU lengths and store run lengths to a temporary buffer, and then go through that buffer, splitting it up into segments, outputting data, etc.

A more efficient way would be to do everything in one pass, outputting data whenever possible.

```
for (;;)
{
   do the following for all the components
   {
      do a temporary thresholding of the DU length
         (if DU-length is below threshold we set it to zero,
   otherwise non-zero)
         if the thresholded DU length is NOT the same as the
   previous DU length
            put run length and run type last in the queue for
   this component
            set the queue to pending
            reset run length
         increase run length
   }
   if ANY queue has pending data
      check if any joining of run lengths can be done
      and reset pending after that has been done
   if NO queue has pending data
      remove data from the front of the queues
      send actual output to the stream
}
```

Other means of classification is to set all Y components as indexed-data, and U and/or V components as non-indexed data, thus allowing a very simple encoding algorithm.

The invention claimed is:

1. A computerized method for generating an index of Data Units of a Variable Length Coded (VLC) image, said method comprising:
   categorizing Data Unit lengths, DU-lengths, as non-indexed DU-lengths,
   categorizing DU-lengths not categorized as non-indexed DU-lengths as indexed DU-lengths,
   generating by a processor a value indicating the number of subsequent DU-lengths categorized as non-indexed in a sequence of subsequent DU-lengths categorized as non-indexed,
   generating a value indicating the number of subsequent DU-lengths categorized as indexed in a sequence of subsequent DU-lengths categorized as indexed,
   generating data representing the DU-length of each DU in the sequence of DU-lengths categorized as indexed,
   storing said generated values and data in the index of Data Units, and
   associating said index of Data Units with the VLC image.

2. The computerized method according to claim 1, wherein the storing of said generated values and data comprises:
   storing said value indicating the number of subsequent DU-lengths categorized as indexed after said value indicating the number of subsequent DU-lengths categorized as non-indexed, and
   storing data representing the DU-lengths of the subsequent DU-lengths categorized as indexed, said data being stored subsequent to the value indicating the number of subsequent DU-lengths categorized as indexed.

3. The computerized method according to claim 1, wherein the index is encoded by means of a Variable Length Code encoder.

4. The computerized method according to claim 3, wherein the generated values indicating the number of non-indexed and indexed DU-lengths are numerically translated symmetrically around zero before encoding.

5. The computerized method according to claim 1, wherein data representing a DU-length are set to a value representing the difference of the present DU-length and the previous DU-length.

6. The computerized method according to claim 3 or 4, wherein the index and generated values are Huffman coded.

7. The computerized method according to claim 1, wherein the categorization includes comparing DU-lengths with a predetermined threshold value and categorizing a DU-length as a non-indexed DU-length if the value of the DU-length is less than the value of the predetermined threshold value.

8. The computerized method according to claim 1, wherein the VLC image is divided into a plurality of blocks and wherein each block is represented by at least three channels, each channel representing a characteristic of the VLC image, wherein a data unit is a channel within a block, and wherein the method further comprising:
   reading all three channels of a block, before the channels of the next block are read,
   generating data relating to subsequent DU-lengths categorized as non-indexed and data relating to subsequent DU-lengths categorized as indexed, respectively, and
   storing the generated data sequentially in the index.

9. The computerized method according to claim 1, wherein each image includes a plurality of channels and wherein values and data from a plurality of channels are interleaved into one data stream.

10. A computerized method for retrieving Data Unit lengths, DU-lengths, from an image associated with an index of DU-lengths, said method comprising:
    linearly reading data from the index,
    when the data is a value indicating a number of subsequent Data Units categorized as not having indexed DU-lengths then these Data Units are sequentially processed by a processor from the image for retrieving the length of each data unit, and
    when the data is a value indicating a number of subsequent Data Units categorized as having indexed DU-lengths then the corresponding number of DU-lengths are retrieved from the index.

11. The computerized method according to claim 10, wherein the data from the index is decoded by means of a Variable Length Code decoder.

12. The computerized method according to claim 10, wherein differential DC coefficients of each DU are decoded and stored as absolute values in RAM.

13. The computerized method according to claim 10, wherein the image is divided into a plurality of blocks and wherein each block is represented by at least three channels, first, second and third channel, each channel representing different characteristics of the image, wherein a data unit is a channel of a block, and wherein the method further comprising:
    reading data from the index indicating the number of subsequent data units of the first channel that is to be retrieved,
    reading data from the index indicating the number of subsequent data units of the second channel that is to be retrieved,
    reading data from the index indicating the number of subsequent data units of the third channel that is to be retrieved, and
    retrieving a DU-length for each channel of a block in accordance with DU-lengths being categorized as indexed or non-indexed.

* * * * *

UNITED STATES PATENT AND TRADEMARK OFFICE
CERTIFICATE OF CORRECTION

PATENT NO.       : 8,554,773 B2
APPLICATION NO. : 13/062273
DATED            : October 8, 2013
INVENTOR(S)      : Niemi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this
Fifteenth Day of September, 2015

Michelle K. Lee
*Director of the United States Patent and Trademark Office*